(12) United States Patent
Wu et al.

(10) Patent No.: US 9,806,619 B2
(45) Date of Patent: Oct. 31, 2017

(54) TIME-INTERLEAVED CURRENT FEEDBACK DROOP FUNCTION FOR MULTIPHASE BUCK CONVERTERS

(71) Applicant: TEXAS INSTRUMENTS INCORPORATED, Dallas, TX (US)

(72) Inventors: Jian-Yi Wu, San Ramon, CA (US); Yongjie Jiang, Ames, IA (US); Haydar Bilhan, Dallas, TX (US); Anthony M Hill, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 32 days.

(21) Appl. No.: 14/923,053

(22) Filed: Oct. 26, 2015

(65) Prior Publication Data

US 2017/0025950 A1    Jan. 26, 2017

Related U.S. Application Data

(60) Provisional application No. 62/194,508, filed on Jul. 20, 2015.

(51) Int. Cl.
*H02M 3/158* (2006.01)
*G05F 1/56* (2006.01)

(52) U.S. Cl.
CPC ............ *H02M 3/1584* (2013.01); *G05F 1/56* (2013.01); *H02M 3/158* (2013.01); *H02M 2003/1586* (2013.01)

(58) Field of Classification Search
CPC .................................................... H02M 3/158
See application file for complete search history.

(56) References Cited

U.S. PATENT DOCUMENTS

| | | | |
|---|---|---|---|
| 2005/0010825 A1* | 1/2005 | Pullen | H02M 3/1584 713/300 |
| 2005/0269992 A1* | 12/2005 | Lai | H02J 7/0031 320/134 |
| 2010/0231154 A1* | 9/2010 | Kamata | H02P 6/007 318/400.32 |

OTHER PUBLICATIONS

Yingyi Yan et al., "Small Signal Analysis and Design of Active Droop Control Using Current Mode Equivalent Circuit Model," Applied Power Electronics Conference and Exposition, 2014 Twenty-Ninth Annual IEEE, Mar. 16, 2014, Fort Worth, Texas, 9 pages.

* cited by examiner

*Primary Examiner* — Jue Zhang
*Assistant Examiner* — Trinh Dang
(74) *Attorney, Agent, or Firm* — John R. Pessetto; Charles A. Brill; Frank D. Cimino

(57) ABSTRACT

Methods and apparatus for providing a time-interleaved current-feedback droop function for multiphase buck converters. An example method includes outputting a first control signal to enable a first set of switches corresponding to a first voltage of a first phase from a multiphase converter, the first phase included in a plurality of phases; enabling a first current associated with the first phase to be measured by a sample and hold circuit associated with the first phase; sampling the first current; holding the first current, the first current based on a load current for the first phase of the multiphase converter; and outputting a droop voltage based on a plurality of currents corresponding to the plurality of phases of the multiphase converter, the plurality of currents including the load current for the first phase.

4 Claims, 10 Drawing Sheets

TIME-INTERLEAVED CURRENT FEEDBACK DROOP FUNCTION FOR MULTIPHASE BUCK CONVERTERS

RELATED APPLICATIONS

This patent claims priority to U.S. Provisional Patent Application No. 62/194,508, filed Jul. 20, 2015, the entirety of which is hereby incorporated by reference.

FIELD OF THE DISCLOSURE

This disclosure relates generally to power converters and, more particularly, to methods and apparatus of applying a time-interleaved current feedback droop function for multiphase buck converters.

BACKGROUND

A buck converter (e.g., direct current to direct current (DC-DC) converter) converts an input voltage down to lower a desired voltage. A multiphase buck converter uses multiple buck converters placed in parallel between an input and a load. Each of the multiple buck converters is operated (e.g., turned on) at equally spaced intervals (e.g., phases) over a period of time. The multiphase buck converter responds quickly to changes in load. Changes in load lead to undesirable voltage spikes (e.g., voltage over shoot and/or voltage under shoot). Reducing the voltage spikes reduces a tolerance band associated with an output voltage of the buck converter, provides less change of triggering over voltage protection, and prolongs life of electronic devices drive by the multiphase buck converter.

SUMMARY

Examples disclosed herein provide a time-interleaved current-feedback droop function for multiphase buck converters. An example apparatus disclosed herein includes a controller to output a first control signal to enable a first set of switches corresponding to a first voltage of a first phase from a multiphase converter, the first phase included in a plurality of phases. In such examples, an amplifier to enable a first current associated with the first phase to be measured by a sample and hold circuit associated with the first phase. In such examples, the sample and hold circuit to a) sample the first current and b) hold the first current, the first current based on a load current for the first phase of the multiphase converter. In such examples, a current-to-voltage converter to output a droop voltage based on a plurality of currents corresponding to the plurality of phases of the multiphase converter, the plurality of currents including the load current for the first phase.

DETAILED DESCRIPTION

Figure 1:
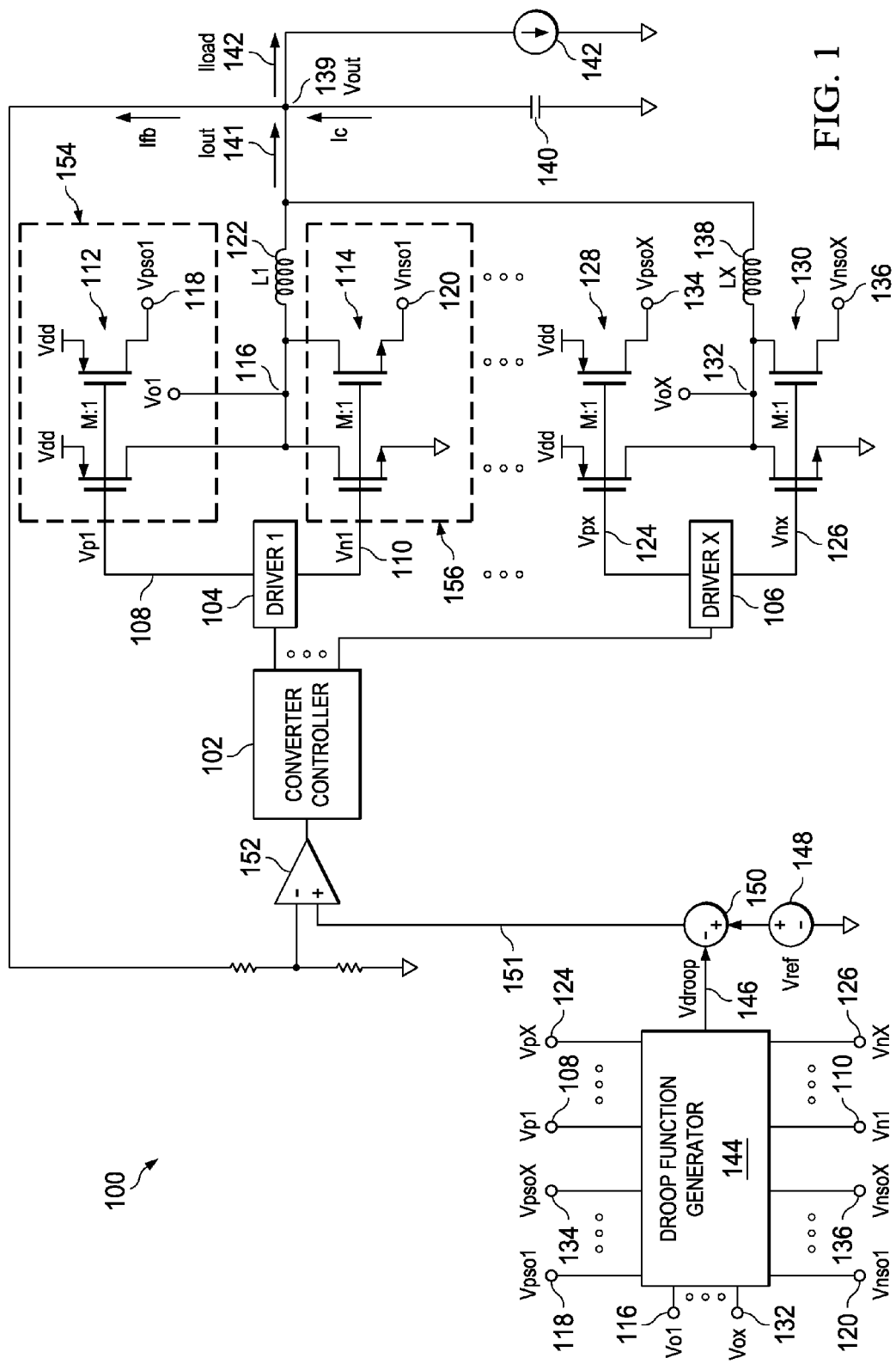
FIG. 1 is an example circuit structured to provide a droop for a multiphase power converter.

Load current sensing power converters (e.g., buck converters) are applied for a plurality of applications. Such applications include over-current protection, reactive phase adding and dropping, and adaptive voltage positioning (AVP) control (e.g., droop control). In some examples, power converters must meet load regulations under strict tolerance bands. Tolerance bands limit under-shoot voltage (e.g., when the voltage goes below a desired output voltage of the power converter) and over-shoot voltage (e.g., when the voltage goes above the desired output voltage). Decreasing a tolerance band increases the life, speed, and performance of electronic devices driven by the power converters.

AVP control lowers the tolerance band by dynamically tracking the power converter's output voltage with a reference voltage that is adjusted based on the load conditions. The AVP control (e.g., droop control) outputs a droop voltage based on the load current. The droop voltage is applied to the reference voltage to determine an amount of adjustment of the power converter's output voltage. For example, when the load current increases, the droop voltage increases and the reference voltage is lowered accordingly. When the load current is low (e.g., near zero), the output voltage is shifted to the edge of the upper bound of the tolerance band to enlarge headroom for an under-shoot. When the load current is high, the output voltage is shifted to the edge of the lower bound to enlarge the over-shoot headroom. Without droop control, the peak to peak voltage is equal to a sum of the voltage overshoot and the voltage undershoot, where both the voltage undershoot and the voltage over shoot are positive voltages. With droop control, the peak to peak voltage is equal to the sum of the voltage overshoot and the voltage undershoot minus the droop voltage. Lowering the peak to peak voltage improves the load transient response (e.g., response of a step current from the load to regulate different phases and speeds in the multiphase converter).

Multiphase converters require additional circuitry to monitor phase current for each phase reacting to load current. Conventional multiphase droop control includes inductor direct current resistance (DCR) current sensing.

DCR current sensing includes adding sense resistor and a sense capacitor in series to match a time constant associated with an inductor of the power converter. When the time constants are matched, the voltage across the sense capacitor (Vc) is proportional to the current flowing through the inductor (e.g., load current) and is used to create a droop voltage. There are two issues associated with conventional DCR sensing for multiphase converters. The first issue is that DCR current sensing is temperature dependent leading to different current measures at different temperatures. A positive temperature coefficient (about 3.9 millivolts/° Celsius) of DCR leads to a higher Vc at a higher temperature for a fixed inductor current and potentially creates a higher droop voltage in a feedback loop associated with the power converter. The output voltage of the power converter may exceed the lower bound of the tolerance band. In order to compensate the increasing Vc at high temperatures, additional external thermal components are required to monitor the temperature of the inductor, leading to a more complex and more expensive integrated circuit (IC).

The second issue is that each phase of a multiphase power converter its own DCR current sensing circuit. As the number of phases increases, the number of both passive and active components required to determine the load current increases, leading to a significant growth in board area and cost.

A second conventional technique for sensing load current to create a droop voltage includes using two current sense amplifiers to measure a current for each phase (e.g., one for detecting a peak current and one for detecting a valley current of the phase). Such conventional techniques determine a droop voltage based on averaging peak and valley currents measured in all phases. Such conventional techniques boost a significant number of current sense amplifiers (e.g., two per phase) in multiphase converters. Thus, a significant amount of power is drawn to produce the droop voltage. Even when the sense amplifiers are not in use, quiescent current (e.g., current lost when while device is not in use) is drawn by the amplifiers. Multiphase power converters are used in many portable electronics and increased power consumption is undesirable.

Examples disclosed herein include determining a droop voltage that is not temperature dependent and decrease the required number of active and passive components by using interphase and/or intraphase current average methods. Interphase current averaging includes using two amplifiers to determine a droop voltage for a power converter with any number of phases. In such examples, the peak current for each phase shares a tracking amplifier through the use of a number of switches and a number of sample and hold (S/H) circuits. The switches allow for a phase current for each phase to be sampled separately in the sample mode of the S/H circuits and to be held in the hold mode of the S/H circuits until all the various phase currents are determined and averaged. Intraphase averaging includes averaging the current from the same phase using multiple S/H circuits. The S/H circuits, activated by sequential clock waveforms, sample the same phase current with different sense field effect transistors (FETs) to create a time-domain and a spatial-domain averaging to improve sensing accuracy.

An example apparatus includes a controller to output a first control signal to enable a first set of switches corresponding to a first voltage of a first phase from a multiphase converter, the first phase included in a plurality of phases. In such examples, an amplifier to enable a first current associated with the first phase to be measured by a sample and hold circuit associated with the first phase. In such examples, the sample and hold circuit to a) sample the first current and b) hold the first current, the first current based on a load current for the first phase of the multiphase converter. In such examples, a current-to-voltage converter to output a droop voltage based on a plurality of currents corresponding to the plurality of phases of the multiphase converter, the plurality of currents including the load current for the first phase.

FIG. 1 is an example block diagram of an illustrated example converter IC 100 including a multiphase power converter with a feedback droop function. The example converter IC 100 includes an example converter controller 102, example drivers 104, 106, example p-channel control lines (e.g., Vp1 and VpX) 108, 124, example n-channel control lines (e.g., Vn1 and VnX) 110, 126, example p-channel metal oxide semiconductor (PMOS) FETs 112, 128, example n-channel metal oxide semiconductor (NMOS) FETs 114, 130, example complementary metal oxide semiconductor (CMOS) transistor outputs (e.g., Vo1 and VoX) 116, 132, example PMOS drain voltages (e.g., Vpso1 and VpsoX) 118, 134, example NMOS source voltages (e.g., Vnso1 and VnsoX) 120, 136, example inductors (e.g., L1 and LX) 122, 138, an example output voltage 139, an example output capacitance 140, an output current 141, an example load current 142, an example droop function generator 144, an example droop voltage (e.g., Vdroop) 146, an example reference voltage (e.g., Vref) 148, an example adjusted reference voltage 151, an example summing point 150, and an example error amplifier 152. Block 154 illustrates the example PMOS transistors 112 which sense the peak current (e.g., Idp) of a first phase in the example converter IC 100. Block 156 illustrates the example NMOS transistors 114 which sense the valley current (e.g., Idv) of a first phase of the example converter IC 100.

In the illustrated example converter IC 100, an output of the example error amplifier 152 outputs a voltage which enables the example converter controller 102 to generate sequential waveforms to enable the drivers (e.g., the example driver1 104 and the example drier X 106). The example converter 100 is a multiphase buck converter. Alternatively, the example converter 100 may be a voltage regulator, a linear regulator, a magnetic converter, an alternating current to direct current (AC-DC) converter (e.g., a rectifier, a mains power supply unit, a switched-mode power supply, etc.), an AC-AC converter (e.g., a transformer, an autotransformer, a voltage converter, a voltage regulator, a cycloconverter, a variable-frequency transformer, etc.), a DC to AC converter (e.g. an inverter), and/or any other device that can convert a first voltage to a second voltage. The example converter 100 regulates the example output voltage $V_{out}$ 116.

The example converter controller 102 includes an input enable signal to allow the converter controller 102 to output signals to multiple phases of the converter IC 100. The example converter controller 102 includes X outputs for the X number of phases of the converter IC 100. The example converter controller 102 enables each of the X outputs at equally spaced intervals over a switching period.

The illustrated converter IC 100 includes X number of example drivers 104, 106 to operate each of the X phases of the converter IC 100. The example drivers 104, 106 control CMOS transistors of the converter IC 100. The drivers 104, 106 may be a transistor, a switch, and/or any other device structured to output voltage and/or current based on an input signal. The outputs of the example driver 1 104 are the example p-channel control signal (e.g., Vp1) 108 and the example n-channel control signal (e.g., Vn1) 110. The outputs of the example driver X 106 are the p-channel control signal (e.g., VpX) 124 and the n-channel control signal (e.g., VnX) 126.

The example Vp1 108 controls the example PMOS transistors 112 and the example Vn1 110 controls the example NMOS transistors 114 for the first phase. The combination of the PMOS transistors 112 and the NMOS transistors 114 create a CMOS circuit for the first phase. An output of at least one of the example CMOS circuit for the first phase is represented by Vo1 116. Similarly, the example VpX 124 controls the example PMOS transistors 128 and the example VnX 126 controls the example NMOS transistors 130 for the phase X. The combination of the PMOS transistors 128 and the NMOS transistors 130 create a CMOS circuit for the phase X. An output of at least one of the example CMOS circuit for the phase X is represented by VoX 132. The example Vpso1 118 and the example VpsoX 134 represent a drain voltage of the example PMOS transistors 112, 128 and the example Vnso1 120 and the example VnsoX 136 represent a source voltage of the example NMOS transistors 114, 130. Although the illustrated example converter IC 100 contains two CMOS circuits for each phase, M number of CMOS circuits may be used for each of the X phases, as further described in FIG. 3.

The droop function generator 144 is a circuit that outputs the example Vdroop 146 based on the example load current 142. The droop function has 3X inputs (e.g., an input for each CMOS output (Vo1 116, VoX 132), an input the PMOS drain (Vpso1 118, VpsoX 134) for each phase, and an input the NMOS source (Vnso1 120, VsnoX 136) for each phase). The output of the droop function generator 114 is the example Vdroop 146. An example structure of the droop function generator 114 is further described in FIG. 2. An example connection of block 154 to the example droop function generator 144 is further described in FIG. 3.

The example error amplifier 152 is a device including two inputs and one output. The example error amplifier 152 may be an op amp comparator, a Schmitt trigger, a positive feedback comparator, a dedicated comparator IC, and/or any other type of comparator. The example error amplifier 152 outputs a digital signal based on a comparison of two inputs (e.g., two voltages or two currents). In the illustrated example converter IC 100, the inputs for the example error amplifier 152 are the output voltage 139 and the difference of the example adjusted reference voltage 151 (e.g., Vref 148 minus the Vdroop 146). In some examples, the example output voltage 139 is scaled by a voltage divider. In some examples, the scaled output voltage may equal to the output voltage 139. An output of the example error amplifier 152 is a low voltage (e.g., 0V) or a high voltage (e.g., 2 V) to indicate which input (e.g., the output voltage 139 or the adjusted reference voltage 151) is larger. For example, when the output voltage 139 is higher than the adjusted reference voltage 151, the example error amplifier 152 outputs the low voltage and when the output voltage 139 is lower than the adjusted reference voltage 151, the example error amplifier 152 outputs the high voltage.

In operation, the example converter controller 102 powers each of the X drivers 104, 106 at equally spaced intervals over a switching period. For example, the converter controller 102 first enables the first example driver 104 while all other drivers are disabled. In such examples, the converter 102 disables driver 1 104 and enables a second driver. The process is repeated after the last driver (e.g., driver X 106) is enabled. While the example first driver 104 is enabled, the first driver pulses the example signals Vp1 108 and Vn1 110 high and low. The example output Vp1 108 and the example output Vn1 110 are buffered to increase their strength to drive the MOSFETs in 154 and 156. While the pulse is low, the example PMOSs 154 are disabled and the example NMOSs 156 are enabled and the example output Vp1 108 and the example output Vn1 110 are pulled up to Vdd. The example output Vo1 116 of the first phase in IC 100 is shorted to ground. While the NMOSs 156 are enabled (e.g., sink state), the current is pulled from the example inductor L1 112 to ground. While the pulse is high, the NMOSs 156 are disabled and the example PMOSs 154 are enabled and the example output Vp1 108 and the example output Vn1 110 are pulled down to ground. In such examples, the example output Vo1 116 of the first phase in IC 100 is shorted to Vdd. While the PMOSs 154 are enabled (e.g., source state) the current is sent into the example inductor L1 122 from Vdd.

The duration of time associated with the sink state and the duration time associated with the source state depend on the example load current 142. If the load current 142 increases, the example output voltage 139 is lowered and the load current 142 flows through the feedback loop to a resistor divider and enters a negative terminal of the example error amplifier 152. The output of the example error amplifier 152 falls and pulls the example Vp1 108 and the Vn1 110 of the example Driver 1 104 to ground. A current is drawn from Vdd, passing through the first inductor L1 122. The current combines with currents passing through the other inductors to create the example output current 141 to compensate for the increasing of the load current 142. The example output voltage 139 increases until it settles on a targeted voltage. The example converter controller 102 determines which driver 104, 106 to enable at which time.

Figure 2:
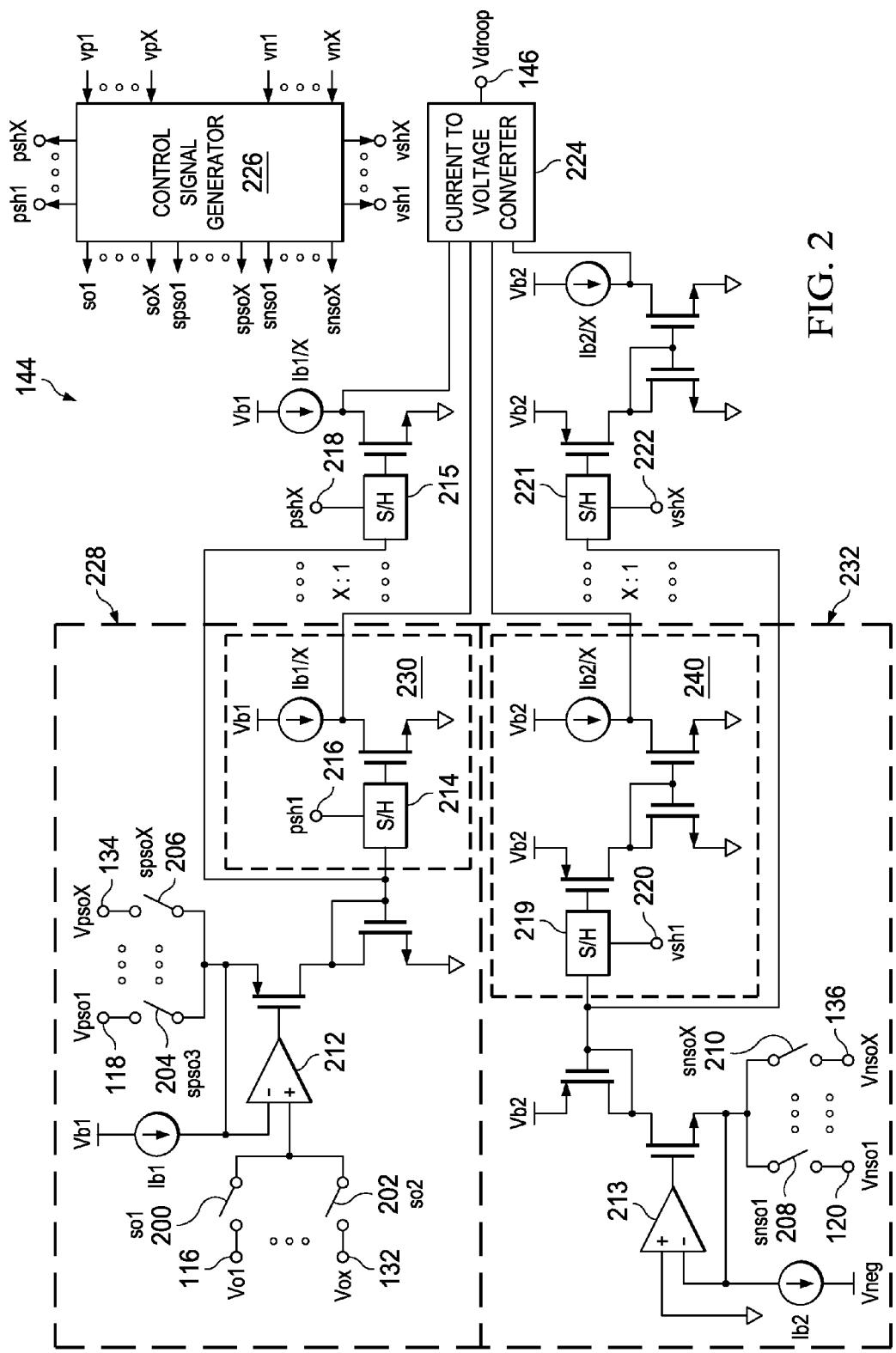
FIG. 2 is an example circuit of an example droop function generator of FIG. 1.

The example droop function generator 144 operates to produce the example Vdroop 146 based on an amount of the load current 142 drawn by additional circuitry associated with the load, as further described in FIG. 2. The droop function generator 144 creates Vdroop 146 based on a determination of the average load current 142 drawn in order to properly adjust the example Vref 148. The example summing block 150 determines the adjusted Vref 151 based on a subtraction of Vdroop 146 from the Vref 148. Adjusting the Vref 148 allows for a comparison of the output voltage 139 to a smaller voltage when the load current 142 is high. Decreasing the reference voltage 148 when the load current 142 increases decrease voltage overshoot and/or voltage undershoot (e.g., the tolerance band) of the output voltage 139.

FIG. 2 is an example implementation of the droop function generator 144 used to create the example Vdroop 146. The example droop function generator 144 includes the example Vo1 116, the example Vpso1 118, the example Vnso1 120, the example VoX 132, the example VpsoX 134, the example VnsoX 136, and the example Vdroop 146 of FIG. 1. Additionally, the example droop function generator 144 includes example switches 200, 202, 204, 206, 208, 210, example tracking amplifiers 212, 213, example sample and hold (S/H) circuits 214, 215, 219, 221, example control signals 216, 218, 220, 222, an example current-to-voltage converter 224, and an example control signal generator 226. The illustrated example droop function generator 144 is divided into peak current detection including blocks 228 and 230 and valley current detection including block 232 and block 240.

The example switches 200-210 are open or closed to allow or prevent current to flow through the example switches 200-210. In the illustrated example of the droop function generator 144, the switches are enabled and/or disabled to allow current to be measured for each of the phases X (e.g., one phase at a time). The example switches 200-210 may be electrical switches (e.g., transistors) and/or mechanical switches.

The example tracking amplifiers 212, 213 are operational amplifiers. Alternatively, the example tracking amplifier 212, 213 may be any feedback circuit capable of amplifying an output. The example tracking amplifiers 212, 213 include two inputs, an output, and a feedback loop. In some examples, the feedback loop manipulates voltages from the example PMOS transistors 112, 128 and/or the example NMOS transistors 114, 130 as further described in FIGS. 3 and 4.

The example S/H circuits 214, 215, 219, 221 sample (e.g., measure) a current flowing through it and hold the current value until the S/H circuit is reset. In some examples, the S/H circuits 214, 215, 219, 221 only hold the sampled value when enabled by the example control signals psh1 216, pshX 218, vsh1 220, and vshX 222. The current of one phase is held by one S/H circuit 214, 215, 219, 221 while the currents for other phases are sampled by other S/H circuits 214, 215, 219, 221.

The example current-to-voltage converter 224 determines and average peak current (e.g., associated with a maximum current drawn while the PMOS is enabled) and an average valley current (e.g., associated with the minimum current drawn while the NMOS is enabled). As further described in FIG. 3, the load current 142 is determined based on the average peak current and average valley current. The current-to-voltage converter 224 outputs the example Vdroop 146 based on the determined load current 142.

The example control signal generator 226 generates instructions to enable and disable a set of switches 200-210 and a set of control signals psh1 216, pshX 218, vsh1 220, and vshX 222 associated with a particular phase to draw the peak and valley current used by the current-to-voltage converter 224 to generate the Vdroop 146. The example control signal generator 226 receives the p-channel signals 108, 124 and n-channel control signals 110, 126 from the example drivers 104, 106 to determine which set of switches and/or signals should be enabled at which point in time. A timing diagram of the example control signal generator 226 is further described in FIGS. 7 and 8. The structure of the control signal generator 226 is further described in FIG. 5.

Figure 3:
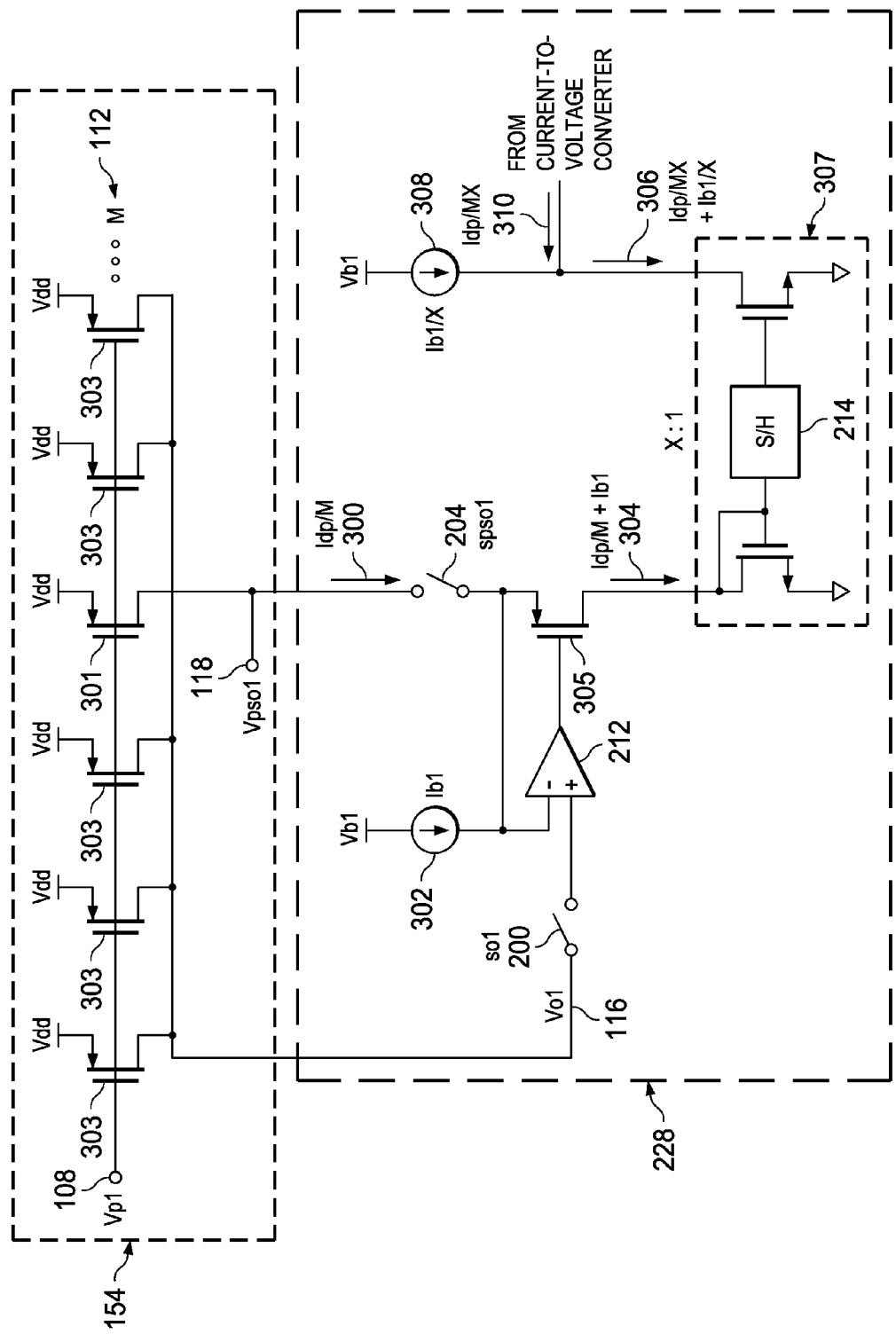
FIG. 3 is an example peak current detection circuit based on a connection between the example circuit of FIG. 1 and the example circuit of FIG. 2.

FIG. 3 is an example connection between block 152 of FIG. 1 and block 228 of FIG. 2. FIG. 3 displays the current flow of the peak current for a first phase in the example converter IC 100 of FIG. 1. The example block 154 includes the PMOS transistors 112 (broken include an example power PMOS transistor 301 and example sensing PMOS transistors 303), the example Vp1 108, and the example Vpso1 118. The example block 228 includes the example Vo1 116, the example switches 200, 204, the example tracking amplifiers 212, 213, the example S/H circuit 214, example currents 300, 302, 304, 306, 308, an example output transistor 305, and an example current mirror 307.

Once switch so1 200 and switch spso1 204 are closed, the example tracking amplifier 212 manipulates the drain to source voltage of the example power PMOS transistor 301 (e.g., Vpso1 118) to equal the drain to source voltage of the sensing PMOS transistors 303 (e.g., Vo1 116). In some examples, multiple PMOS transistors 303 are used to reduce an undesirable gradient effect associated with using one transistor. The gradient effect causes non-linearity in the output of the PMOS transistors 303. By increasing the M number of PMOS transistors 303 the relationship between an input and the output of the PMOS transistors 303 is more linear and more accurate.

The output from the example tracking amplifier 212 is a source-to-gate voltage associated with the example PMOS drain voltages (e.g., the example Vpso1 118 and the example VpsoX 134) since the example output PMOS transistor 305 should always remain on (e.g., enabled) allowing Idp/M current 300 to flow toward the output PMOS transistor 305. The example Idp/M current 300 is the load current 142 scaled (e.g., divided) by the M number of PMOS transistors 112. The Idp/M 300 current is combined with the bias current Ib1 302 to create the example Idp/M+Ib1 current 304 through the drain of the output PMOS transistor 305 and into the example current mirror 307.

The example current mirror 307 creates the same current at the drain of each NMOS transistor. Although the example illustration of FIG. 3 has one current mirror 307, a multi-phase current mirror will have X number of current mirrors 307 in parallel to sample the X phases, therefore the drain of the output of the current mirror is represented by Idp/MX+Ib1/X 306 (e.g., the Idp/M+Ib1 current 304 divided by the X number of phases). Additionally, due to the X phases (e.g., X current mirrors 307), the example bias current 308 drawn from the bias voltage Vb1 will be Ib1/X. By Kirchoff's law (e.g., the sum of currents flowing into a node must equal the sum of the currents flowing out of the node), the example scaled peak current 310 that is drawn from the example current-to-voltage converter 224 is Idp/MX (e.g., Idp/MX+Ib1/X−Ib1/X=Idp/MX). The peak current 310 is a scaled peak current of a first phase. The peak current 310 is then found for the second phase by disabling switches 200, 204 and enabling switches associated with the second phase. Once all the scaled peak currents from each phase are determined, the current-to-voltage converter 224 adds up the peak current for each phase and multiplies by the number of PMOS transistors). Since each peak current is divided by X number of phases, and the current-to-voltage converter 224 has summed all peak currents, the sum is the average peak current divided by M PMOS transistors 112. For example, for a two phase converter, with 10,000 PMOS transistors 112, a scaled peak current for a first phase may be 0.5 milliamps (mA) (e.g., 10 A/((10,000 PMOS)(2 phases)) and a peak current for a second phase may be 0.6 mA (e.g., 12 A/((10 PMOS)(2 phases)) thus the current-to-voltage converter 224 determines that the average peak current is 11 A by multiplying the summed peak currents by the M number of PMOS transistors 112 (e.g., (0.5 mA+0.6 mA)(10,000 PMOS)).

Figure 4:
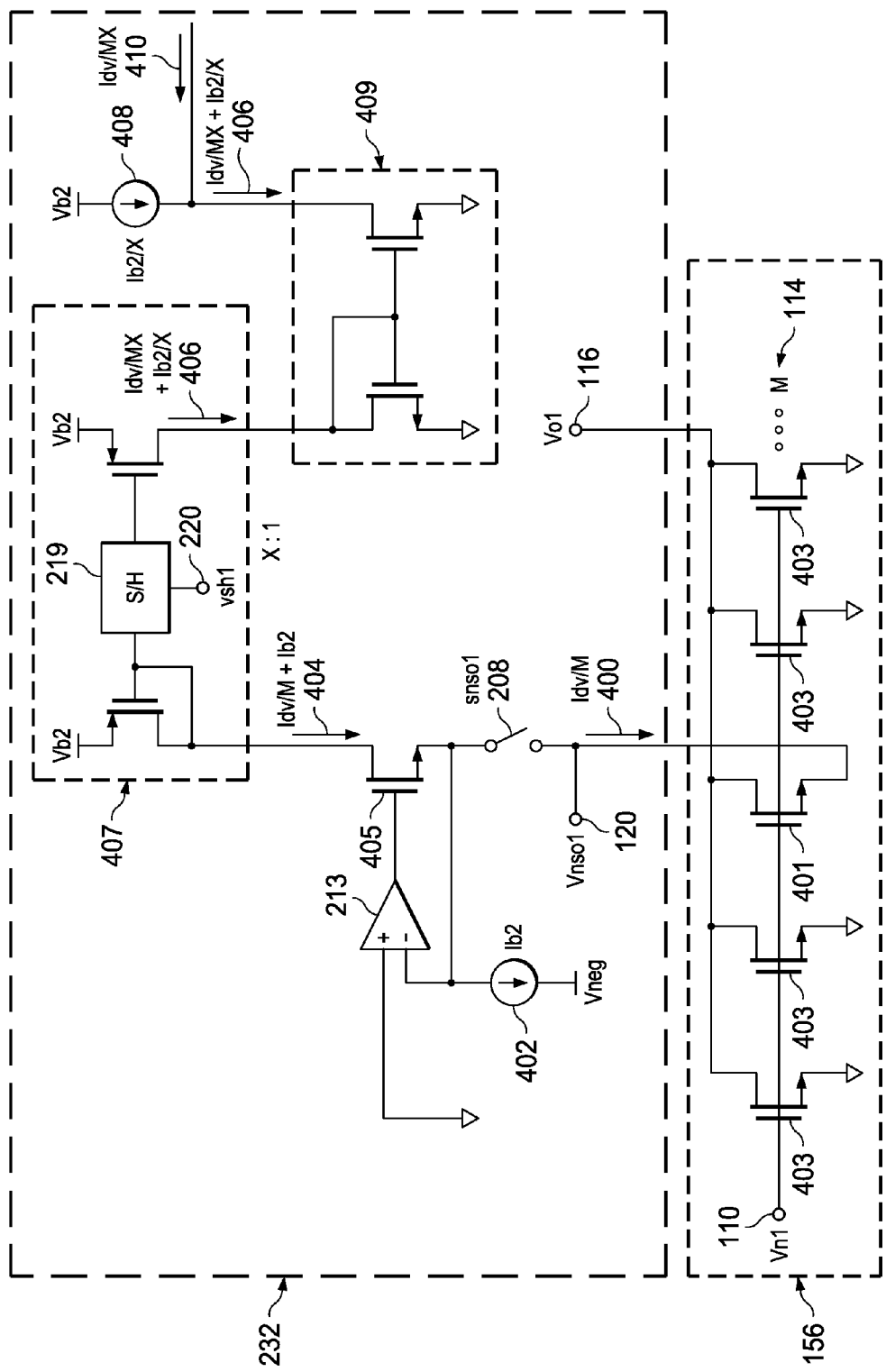
FIG. 4 is an example valley current detection circuit based on a connection between the example circuit of FIG. 1 and the example circuit of FIG. 2.

FIG. 4 is an example connection between block 156 of FIG. 1 and block 232 of FIG. 2. FIG. 4 displays the current flow of the valley current for a first phase in the example converter 100 of FIG. 1. The example block 154 includes the NMOS transistors 130 (broken include an example power CMOS transistor 401 and example sensing CMOS transistors 403), the example Vn1 110, the example Vo1 116, and the example Vnso1 120. The example block 232 includes the example switch 208, the example tracking amplifier 213, and the example S/H circuit 219, example currents 400, 402, 404, 406, 408, 410, 412, an example output NMOS transistor 405, and example current mirrors 407, 409.

During n-channel operation, current flowing though inductor L1 122 may be positive or negative. Thus, the example NMOS transistors 412 are bidirectional. The illustrated example of FIG. 4 displays the Idv/M current 400 as a positive current (e.g., the current flowing through the example inductor L1 122 is positive); however the Idv/M current 400 may be negative. In examples where the current is negative, the direction of flow for Idv/M 400 is in the opposite direction, but the result is the same.

Once the example switch snso1 208 is closed, the example tracking amplifier 213 manipulates the drain to source voltage of the example power NMOS transistor 401 (e.g., Vnso1 116) to equal the drain to source voltage of the sensing PMOS transistors 403 (e.g., Vo1 116). In some examples, multiple NMOS transistors 403 are used to reduce an undesirable gradient effect associated with using one transistor. The gradient effect causes non-linearity in the output of the NMOS transistors 403. By increasing the M number of NMOS transistors 403 the relationship between an input and the output of the NMOS transistors 403 is more linear and more accurate.

The output from the example tracking amplifier 213 is arbitrary since the example output NMOS transistor should always remain on (e.g., enabled) allowing the example Idv/M+Ib2 current 404 to flow through the drain toward the source of the example output NMOS 405. By Kirkoff's law, the example Idv/M+Ib2 current 404 is split into the example bias current Ib2 402 and the example Idv/M 400 current 400. The Idv/M 400 current 400 flows toward the example power CMOS transistor 401.

The example current mirror 407 creates the same current at the source of each PMOS transistor. Although the example illustration of FIG. 4 has one current mirror 307, a multi-phase current mirror will have X number of current mirrors 307 in parallel to sample the X number of phases, therefore the output of the current mirror is represented by Idv/MX+Ib2/X 406 (e.g., the Idv/M+Ib2 current 304 divided by the X number of phases). The Idv/MX+Ib2/X current 406 is input into the second example current mirror 409 which is mirrored at the output of the current mirror 409. Due to the X number of phases (e.g., X current mirrors 407), the example bias current 408 drawing from the bias voltage Vb2 will be Ib2/X. Therefore, through Kirkoff's law, the example scaled valley current 410 that is drawn from the example current-to-voltage converter 224 is Idv/MX (e.g., Idv/MX+Ib2/X−Ib2/X=Idv/MX). The scaled valley current 410 is a scaled valley current of a first phase. The scaled valley current 410 is then determined for the second phase by disabling switch snso1 208 and enabling a switch associated with the second phase. Once all the valley currents from each phase have been determined, the current-to-voltage converter 224 adds up the valley current for each phase and multiplies by the number of NMOS transistors). Since each valley current is divided by X number of phases, and the current-to-voltage converter 224 has summed all valley currents, the sum is the average valley current divided by M NMOS transistors 114. For example, for a two phase converter, with 10,000 NMOS transistors 114, a valley current for a first phase may be 0.15 mA (e.g., 3 A/((10,000 NMOS)(2 phases)) and a valley current for a second phase may be 0.2 mA (e.g., 4 A/((10,000 NMOS)(2 phases)) thus the current-to-voltage converter 224 determines that the average valley current is 3.5 A by multiplying the summed valley currents by the M number of NMOS transistors 114 (e.g., (0.15 mA+0.2 mA)(10,000 NMOS)).

Figure 5A:
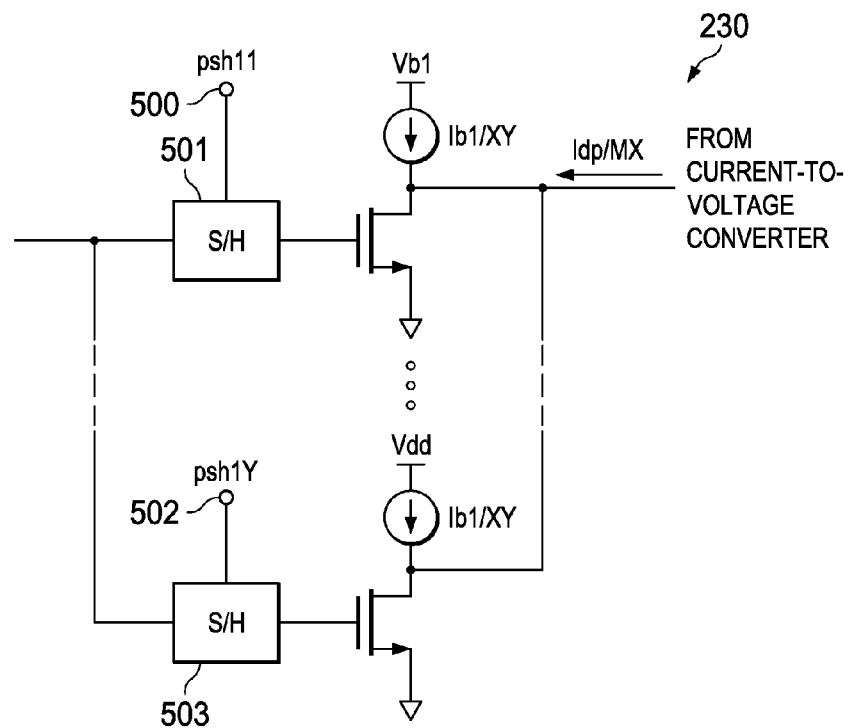
FIGS. 5A and 5B are example intraphase circuits based on a portion of the example circuit of FIG. 1.

FIG. 5A provides an example intraphase current averaging circuit 230 for determining a peak current from a first phase. The example intraphase circuit 230 includes multiple S/H circuits 501, 503 to measure multiple intraphase peak currents for the first phase. The multiple peak currents are summed to determine an average peak current for the same phase. Averaging multiple current for the same phase creates a more robust peak current measurement by minimizing interference errors associated with a single measurement. The example circuit 230 includes S/H circuits 501, 503 and example control signals 500, 502.

The example intraphase current averaging circuit 230 includes Y number of S/H circuits 501, 503 for a single phase. Each of the Y number of the S/H circuits samples and holds 1/Y of the current when enabled by the control signals psh11 500, psh1Y 502, etc. While each current is sampled and held, the total current drawn by the phase (e.g., Idp/MX) is the average peak current scaled by the X number of phases and M number of PMOS transistors 112. For example, control signal psh11 500 and control signal psh1Y 502 are enabled to sample and hold a peak current for a first phase. For a two phase buck converter (e.g., X=2) with 20,000 PMOS transistors 112 (e.g., M=20,000) and two S/H circuits 501, 503 per phase (e.g., Y=2), if the first S/H circuit 501 measures 13 A and the second S/H circuit 503 measures 11 A, then the drawn average current will be 0.3 mA (e.g., 11 A/((2 phase)(20,000 PMOS)(2 S/H))=0.14 mA, 13 A/((2 phase)(20,000 PMOS)(2 S/H))=0.16 mA, and 0.14 mA+0.16 mA=0.3 mA). Since the average drawn current is a scaled (e.g., divided) by the number of phases and the number of PMOS transistors 112, the average peak current for the first phase may be generated by the current-to-voltage converter 224 and/or an amplifier by multiplying the peak current by the number of phases (e.g. X) and the number of PMOS transistors (e.g., M) (e.g., Ipeak=(0.3 mA) (2 phases) (20,000 PMOS)=12 A). Although the example described above was described in reference to a two phase converter with 20,000 PMOS transistors 112 and 2 S/H circuits 501, 503 per phase, the example circuit 230 may include any number of phases, PMOS transistors 112, and/or S/H circuits 501,503 per phase.

Figure 5B:
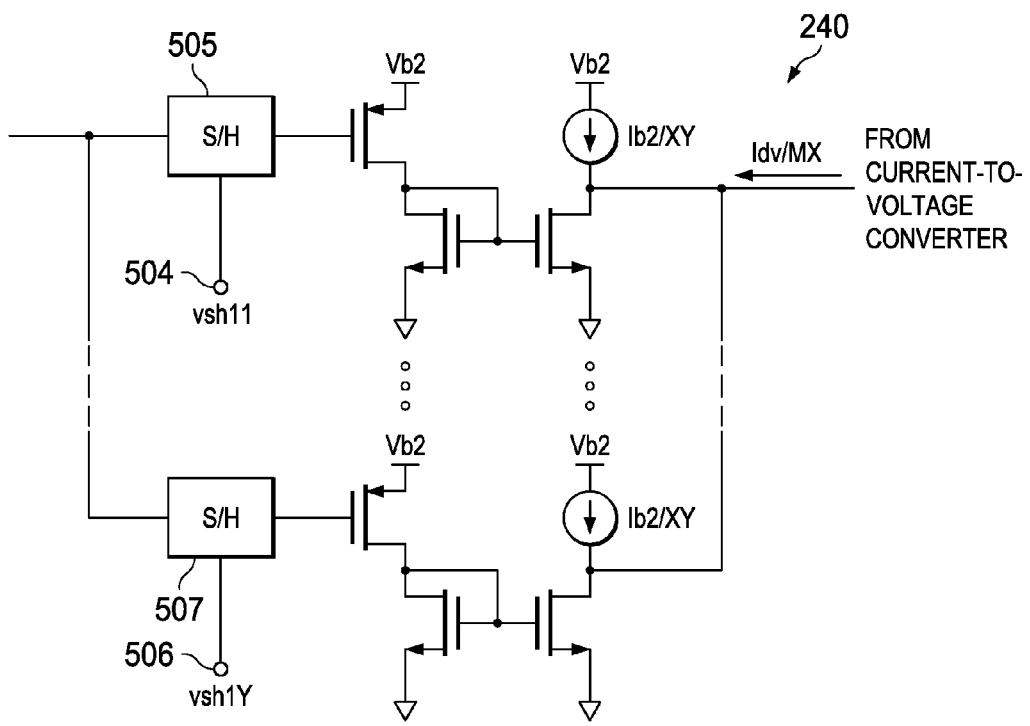

FIG. 5B provides an example intraphase current averaging circuit 240 for determining a valley current from a first phase. The example intraphase circuit 240 includes multiple S/H circuits 505, 507 to measure multiple intraphase valley currents for the first phase. The multiple valley currents are summed to determine an average valley current for the same phase. Averaging multiple current for the same phase creates a more robust valley current measurement by minimizing interference errors associated with a single measurement. The example circuit 240 includes S/H circuits 505, 507 and example control signals 504, 506.

The example intraphase current averaging circuit 240 includes Y number of S/H circuits 505, 507 for a single phase. Each of the Y number of the S/H circuits samples and holds 1/Y of the current when enabled by the control signals vsh11 504, vsh1Y 506, etc. While each current is sampled and held, the total current drawn by the phase (e.g., Idp/MX) is the average valley current scaled by the X number of phases and M number of NMOS transistors 114. For example, control signal vsh11 504 and control signal vsh1Y 506 are enabled to sample and hold a valley current for a first phase. For a two phase buck converter (e.g., X=2) with 20,000 NMOS transistors 114 (e.g., M=20,000) and two S/H circuits 505, 507 per phase (e.g., Y=2), if the first S/H circuit 505 measures 13 A and the second S/H circuit 507 measures 11 A, then the drawn average current will be 0.3 mA (e.g., 11 A/((2 phase)(20,000 NMOS)(2 S/H))=0.14 mA, 13 A/((2 phase)(20,000 NMOS)(2 S/H))=0.16 mA, and 0.14 mA+0.16 mA=0.3 mA). Since the average drawn current is a scaled (e.g., divided) by the number of phases and the number of NMOS transistors 114, the average valley current for the first phase may be generated by the current-to-voltage converter 224 and/or an amplifier by multiplying the valley current by the number of phases (e.g. X) and the number of NMOS transistors (e.g., M) (e.g., Ivalley=(0.3 mA) (2 phases) (20,000 NMOS)=12 A). Although the example described above was described in reference to a two phase converter with 20,000 NMOS transistors 114 and 2 S/H circuits 505, 507 per phase, the example circuit 240 may include any number of phases, NMOS transistors 114, and/or S/H circuits 505,507 per phase.

Figure 6:
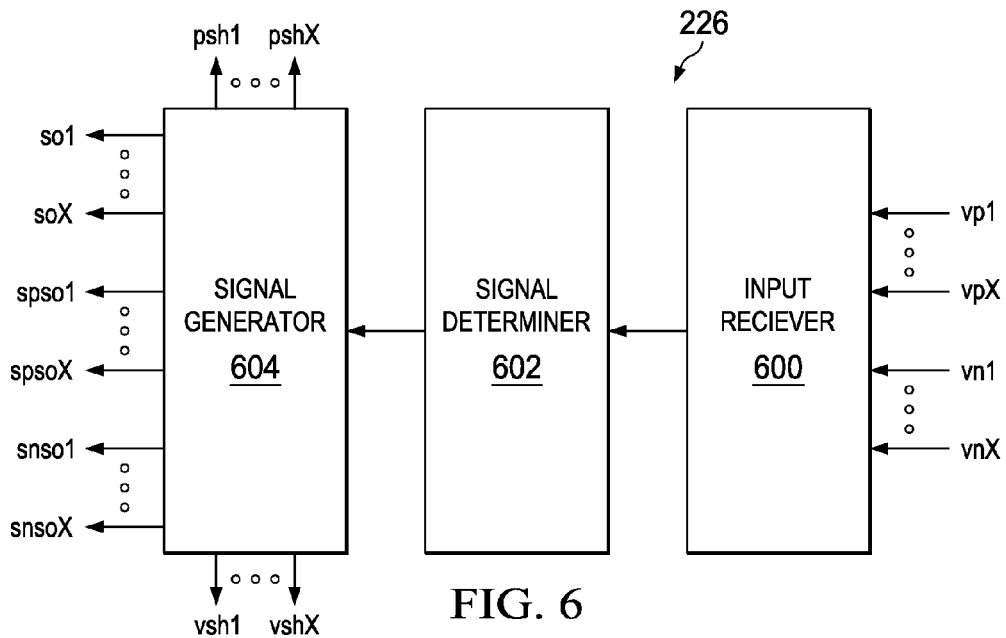
FIG. 6 is an example block diagram of a control signal generator 226 of FIG. 2.

FIG. 6 is a block diagram of an example implementation of the control signal generator 226 of FIG. 2, disclosed herein, to operate the example switches 200-210 and the example control signals 216, 218, 220, and 222. While the example control signal generator 226 of FIG. 6 is described in conjunction with the illustrated example IC 144, the example control signal generator 226 may be utilized to control any IC associated with in a converter. The example control signal generator 226 is implemented to control the example IC 144 and/or any device where converters are used.

The example control signal generator 226 includes an example input receiver 600, an example signal determiner 602, and an example signal generator 604. The input receiver 600 receives signals from the example drivers 104, 106 of FIG. 1. The example signal determiner 602 determines which set of switches and/or S/H circuits to enable based on the received signals. The signal generator generates and transmits a control signal to the determined set of switches and/or S/H circuits to measure a peak and/or valley current for a phase The example input receiver 600 receives the p-channel control signals 108, 124 and the n-channel control signals 110, 126 from the outputs of the example drivers 104, 106. The outputs of the drivers 104, 106 identify which phase is currently being operated and determine whether a peak or a valley is being operated. For example, if the input receiver 600 receives a high voltage from Vp1 108, then the peak of the first phase is being operated and the peak current for the first phase may be measured. If the input receiver receives a high voltage from VnX 126, then the valley of the last phase is being operated and the valley current of the last phase may be measured.

The example signal determiner 602 determines which of the example switches 200-210 and which of the example control signals 216-222 should be enabled and/or disabled based on the received input. In some examples, there may be more, or less, switches and/or control signals (e.g., based on the number of phases). Each peak and each valley for each phase is associated with a switch(es) and/or control signal for a S/H circuit(s) 214, 215, 219, 221. For example, the peak current of the first phase is associated with the example switch so1 200, the example switch spso1 204, and the example control signal psh1 216. In some examples (e.g., such as the example intraphase circuit 230), there are multiple example S/H circuits 501, 503 (e.g., and thus multiple control signals 500, 502) for each phase. If the example input receiver 600 receives a signal from Vp1 108, the switch determine 602 determines that the switch so1 200, the switch spso1 204, and the control signal psh1 216 should be enabled.

The example signal generator 604 generates and transmits signals to enable the example switches 200-210 and the example control signals 216-222 based on the determination of the signal determiner 602. In some examples, the signal generator 604 outputs a voltage to the determined switch(es) and/or control signal(s) for a preset duration of time. The duration of time is long enough for the peak current to be measured. For example, the signal generator 604 may output a 1.2 V signal to the example switch so1 200, the example switch spso1 204, and the example control signal 216 for 50 milliseconds. In such examples, outputting a 1.2 V signal for 50 milliseconds is sufficient to measure the peak current. Alternatively, any voltage and/or any duration of time may be used. In some examples, the voltage and/or duration may be different for different switches 200-210 and/or different S/H circuits 214, 215, 220, 221.

While example manners of implementing the example control signal generator 226 of FIG. 2 are illustrated in FIG. 6, elements, processes and/or devices illustrated in FIG. 6 may be combined, divided, re-arranged, omitted, eliminated and/or implemented in any other way. Further, the example input receiver 600, the example signal determiner 602, the example signal generator 604, and/or, more generally, the example control signal generator 226 of FIG. 6, may be implemented by hardware, machine readable instructions, software, firmware and/or any combination of hardware, machine readable instructions, software and/or firmware. Thus, for example, any of the example input receiver 600, the example signal determiner 602, the example signal generator 604, and/or, more generally, the example control signal generator 226 of FIG. 6, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input receiver 600, the example signal determiner 602, the example signal generator 604, and/or, more generally, the example control signal generator 226 of FIG. 6, is/are hereby expressly defined to include a tangible computer readable storage device or storage disk such as a memory, a digital versatile disk (DVD), a compact disk (CD), a Blu-ray disk, etc. storing the software and/or firmware. Further still, the example control signal generator 226 of FIG. 6 includes elements, processes and/or devices in addition to, or instead of, those illustrated in FIGS. 7 and 8, and/or may include more than one of any or all of the illustrated elements, processes and devices.

Figure 7:
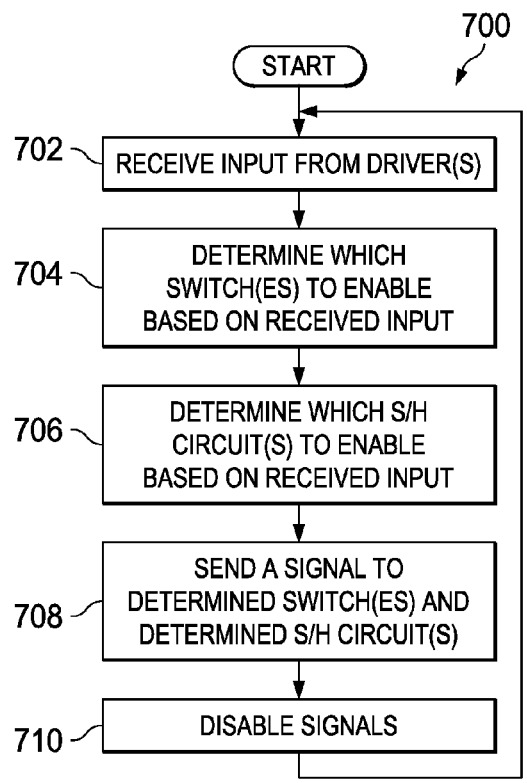
FIG. 7 is an example flowchart representative of example machine readable instructions that may be executed to implement the example control signal generator of FIG. 6 to enable switches and sample and hold circuits of FIGS. 2-4 using an interphase average.
Figure 8:
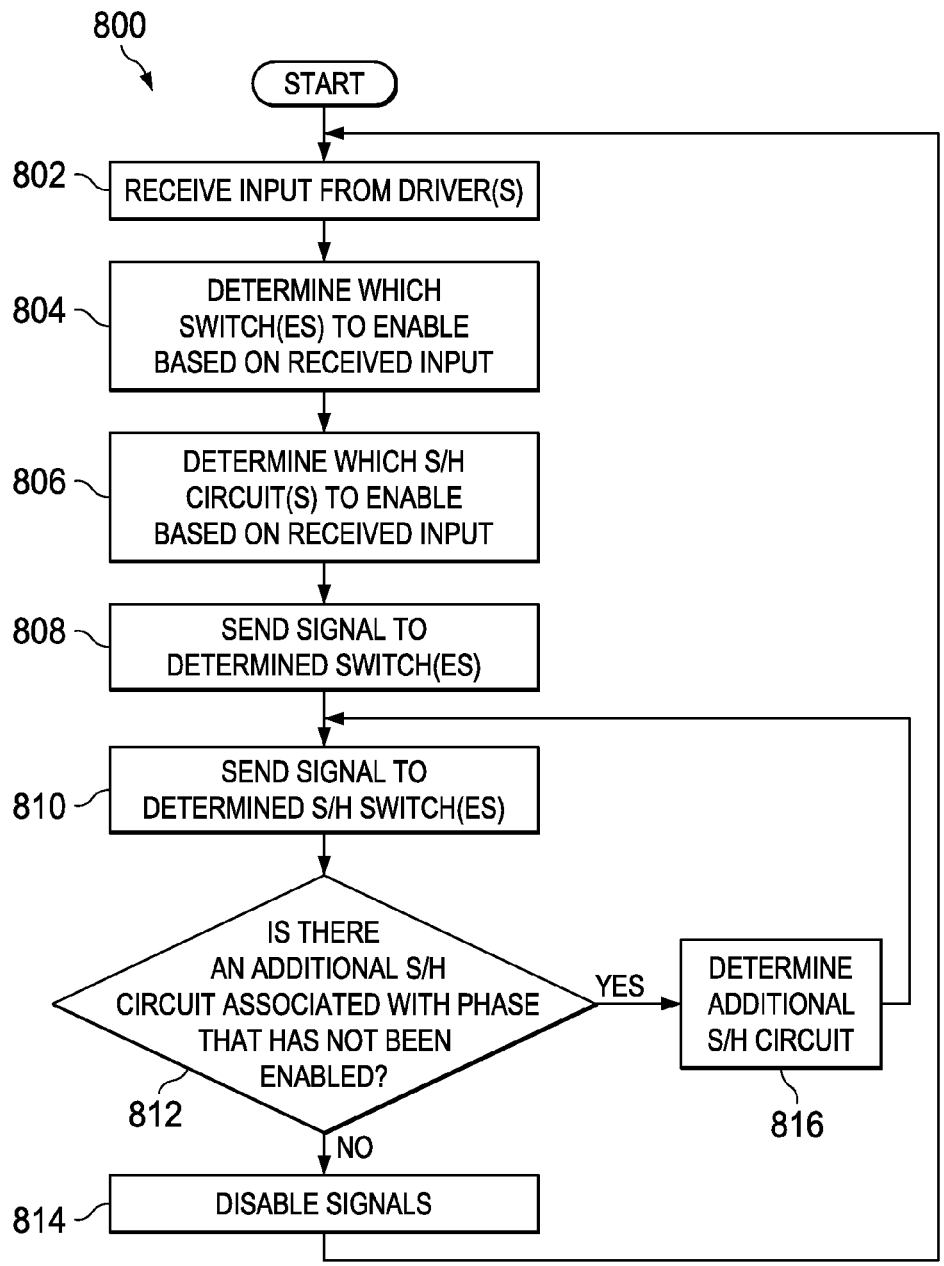
FIG. 8 is a flowchart representative of example machine readable instructions that may be executed to implement the example control signal generator of FIG. 6 to enable switches and sample and hold circuits of FIGS. 2-4 using an interphase and an intraphase average.

Flowcharts representative of example machine readable instructions for implementing the example control signal generator 226 of FIG. 6 is shown in FIGS. 7 and 8. In the examples, the machine readable instructions comprise a program for execution by a processor such as the processor 1012 shown in the example processor platform 1000 discussed below in connection with FIG. 10. The program may be embodied in machine readable instructions stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7 and 8, many other methods of implementing the example control signal generator 226 of FIG. 6 may alternatively be used. For example, the order of execution of the blocks may be changed, and/or some of the blocks described may be changed, eliminated, or combined.

As mentioned above, the example processes of FIGS. 7 and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is an example flowchart 700 representative of example machine readable instructions that may be executed to cause the control signal generator 226 of FIG. 5 to enable a set of the example switches 200-210 and the example S/H circuits 214, 215, 219, 221 to determine an interphase current average associated with the example Vdroop 146. Since there are multiple phases, each drawing a peak current and a valley current, for a multiphase converter, determining the average load current 142 involves averaging the peak currents and the valley currents for all of the phases. The average current is determined by the example current-to-voltage converter 224 and the Vdroop 146 is output based on the average current. In the illustrated example of FIG. 7, the first input signal is associated with the p-channel control signal 108 of the example first driver 104. Alternatively, any channel from any driver and/or any combination of drivers may be the first input signal.

At block 702, the example input receiver 600 receives the example p-channel control signal 108 from the example first driver 104 (e.g., for the first phase). The signal determiner 602 determines which switch(es) to enable (e.g., close) based on the received input (block 704). For example, the p-channel control signal 108 of the example first driver 104 is associated with the switch so1 200 and the switch spso1 204. In such examples, the signal determiner 602 would determine that the switch so1 200 and the switch spso1 204 should be enabled to allow current, associated with the peak current of the first phase, to flow.

At block 706, the example signal determiner 602 determines which control signal to enable based on the received input. For example, the p-channel control signal 108 from the example first driver 104 is associated with the control signal psi 216 for S/H circuit 214. In such examples, the signal determiner 602 would determine that the control signal psi 216 should be enabled to sample and hold a current associated with the peak current of the first phase.

At block 708, the example signal generator 604 generates and transmits a signal to the determined switch(es) (e.g., the example switches so1 200 and spso1 204) and the determined S/H circuit 214 via a control signal(s) (e.g., the example control signal psh1 216). As previously described, the generated signal may be any voltage for any duration of time. In some examples, the voltage and/or duration of time is based on characteristics of the switches 200-210 and/or S/H circuits 214, 215, 219, 221. In some examples, the voltage and/or duration may be different for different switches 200-210 and/or S/H circuits 214, 215, 219, 221. Once the example signal generator 604 sends a control signal to the determined switch(es) (e.g., the example switches so1 200 and spso1 204) and the control signal(s) (e.g., the example control signal psh1 216), the signal generator 604 disables the transmitted signal and the process is repeated for an additional received input from the example first driver 104 and/or a different driver (e.g., the example driver X 106) (block 710).

FIG. 8 is an example flowchart 800 representative of example machine readable instructions that may be executed to cause the control signal generator 226 of FIG. 5 to enable a set of the example switches 200-210 and the example S/H circuits 501, 503 to determine an interphase and intraphase current average used to determine the example Vdroop 146 in conjunction with FIG. 5. As previously described, interphase current averaging determines the example Vdroop 146 based on an average of peak and valley current from multiple phases. Intraphase current averaging determines an average peak and/or valley current based multiple measurements of the same phase. Since interference can corrupt a single current measure, the peak and/or valley current may be measured multiple times and averaged to determine a more accurate current measurement. In the illustrated example of FIG. 8, the first input signal is associated with the p-channel control signal 108 of the first driver 104. Alternatively, any channel from any driver and/or any combination of drivers may be the first input signal.

At block 802, the example input receiver 600 receives the example p-channel control signal 108 from the example first driver 104 (e.g., for the first phase). The signal determiner 602 determines which switch(es) to enable (e.g., close) based on the received input (block 804). For example, the p-channel control signal 108 from the example first driver 104 is associated with the switch so1 200 and the switch spso1 204. In such examples, the signal determiner 602 determines that the switch so1 200 and the switch spso1 204 should be enabled to allow current associated with the peak current of the first phase to flow.

At block 806, the example signal determiner 602 determines which S/H circuit (e.g., the example S/H circuit 501) to enable based on the received input. As previously described, the example intraphase IC circuit 230 has multiple S/H circuits 501, 503 for each phase. For example, the p-channel control signal Vp1 108 from the example first driver 104 has Y S/H circuits 501, 503. In such examples, the signal determiner 600 would determine that the S/H circuit 501 will be enabled first (e.g. through control signal psh11 500) to sample and hold a first current associated with the peak current of the first phase.

At block 808, the example signal generator 604 generates and transmits a signal to the determined switch(es) (e.g., switch so1 200 and switch spso1 204) to enable (e.g., close) the determined switch(es). As previously described, the generated signal may be any voltage. In some examples, the voltage is based on characteristics of the switches 200. In some examples, the voltage may be different for different switches 200-210.

At block 810, the example signal generator 604 generates and transmits a signal to the first example S/H circuit 501 via an example control signal (e.g., psh11 500). As previously described, the generated signal may be any voltage for any duration of time. In some examples, the voltage and/or duration of time is based on characteristics of the S/H circuit 501. In some examples, the voltage and/or duration may be different for different S/H circuit (e.g., the example second S/H circuit 503).

At block 812, the signal determiner 602 determines if there are additional S/H circuits (e.g., the example S/H circuit 503) associated with the first phase that have not been enabled. If there are no additional S/H circuits associated with the first phase that have not yet been enabled (e.g., both S/H circuit 501 and G/H circuit 503 have been enabled), the example signal generator 604 disables the signals to switch(es) (e.g., the example switches so1 200 and spso1 204) and control signals (e.g., psh11 500) associated with the first phase and the process is repeated for a valley current measurement and/or a second phase current measurement (block 814). If there is an additional S/H circuit (e.g., S/H circuit 503) associated with the first phase that has not been enabled, the example signal generator 604 disables the control signal psh11 500 associated with the first S/H circuit 501 (block 816), and the peak current is measured by enabling the additional S/H circuit (e.g., S/H circuit 503).

Figure 9:
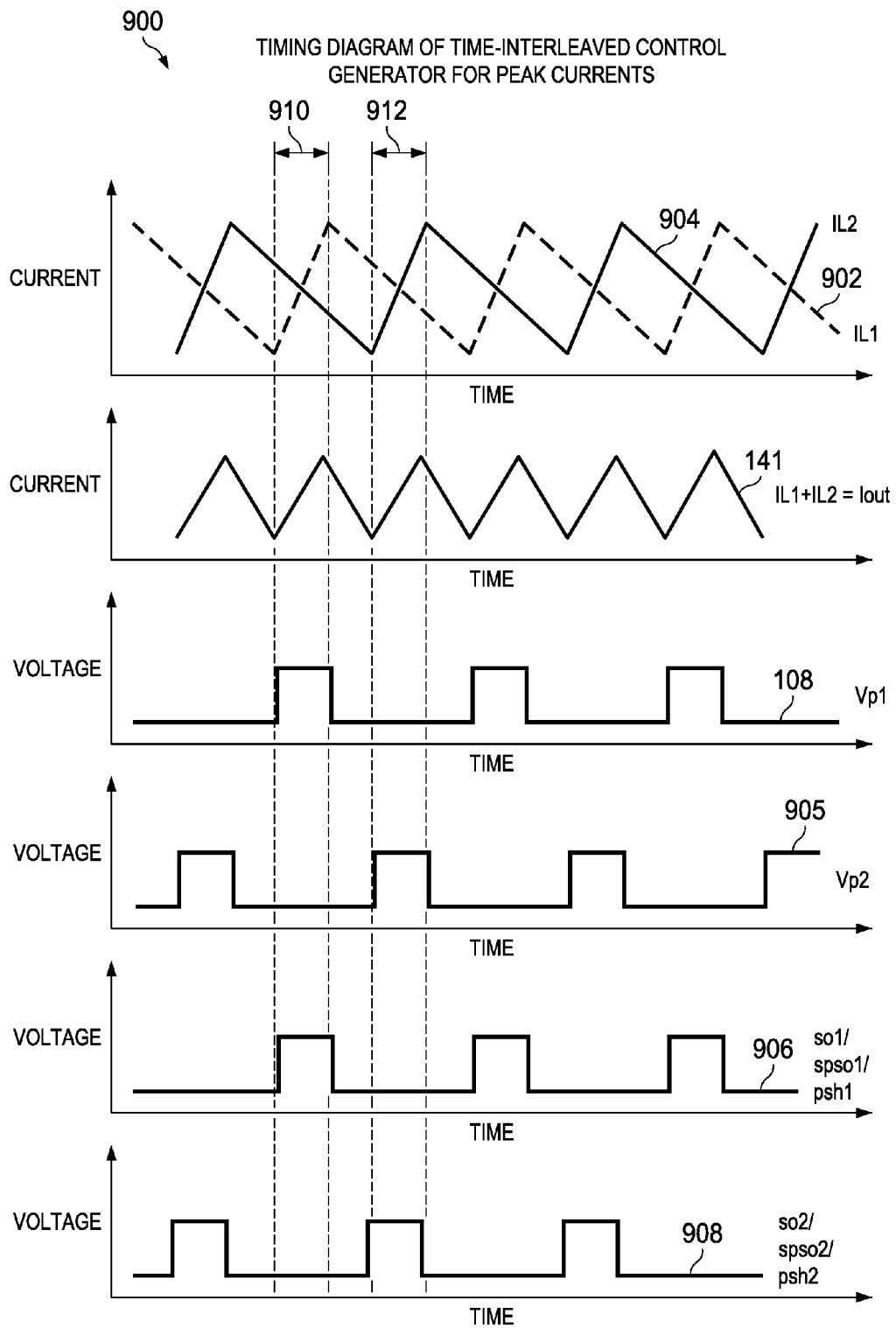
FIG. 9 is an example timing diagram for a time-interleaved control generator for peak current.

FIG. 9 is an example timing diagram 900 for the example control-interleaved control signal generator 226 for peak currents. The example timing diagram 900 includes an example first inductor (e.g., L1 122) current 902, an example second inductor current 904 (e.g., IL2), an example sum current (e.g., representative of the example output current 141), the example voltage Vp1 108, an example second p-channel driver voltage Vp2 905, an example first phase control signal 906, an example phase X control signal 908, an example first phase p-channel enable duration 910, and an example phase X p-channel enable duration 912. Although the example timing diagram 900 is illustrated with two example phases, number of phases may be implemented.

During the first phase p-channel enable duration 910, the example first phase driver 104 outputs a high voltage for Vp1 108. At the same time, the example first phase control signal 906 (e.g., operating the example so1 200, the example spso1 204, and the example control line phs1 216) is enabled. In some examples, the example first phase control signal 906 and the example phase X control signal 908 may include multiple control signals for multiple S/H circuits (e.g., such as S/H control circuits 501, 503 of the example intraphase current IC 230 of FIG. 5) associated with the phase. Since Vp1 108 is high and the example first phase control signal 906 is high, the example IL1 current 902 increases. The peak current for the first phase is determined, during the example first phase p-channel enable duration 910.

During the phase X p-channel enable duration 912, the example phase X driver 106 outputs a high voltage for Vp2 905. At the same time, the example phase X control signal 908 (e.g., operating an example second so2, an example spso2, and an example control line phs2 associated with a second phase) is enabled. In some examples, the example first phase control signal 906 and the example phase X control signal 908 may include multiple control signals for multiple S/H circuits (e.g., such as S/H control circuits 501, 503 of the example intraphase current IC 230 of FIG. 5) associated with the phase. Since Vp2 905 is high and the example phase X control signal 908 is high, the example IL2 current 904 increases. The peak current for the phase X is determined, during the example phase X p-channel enable duration 912.

Figure 10:
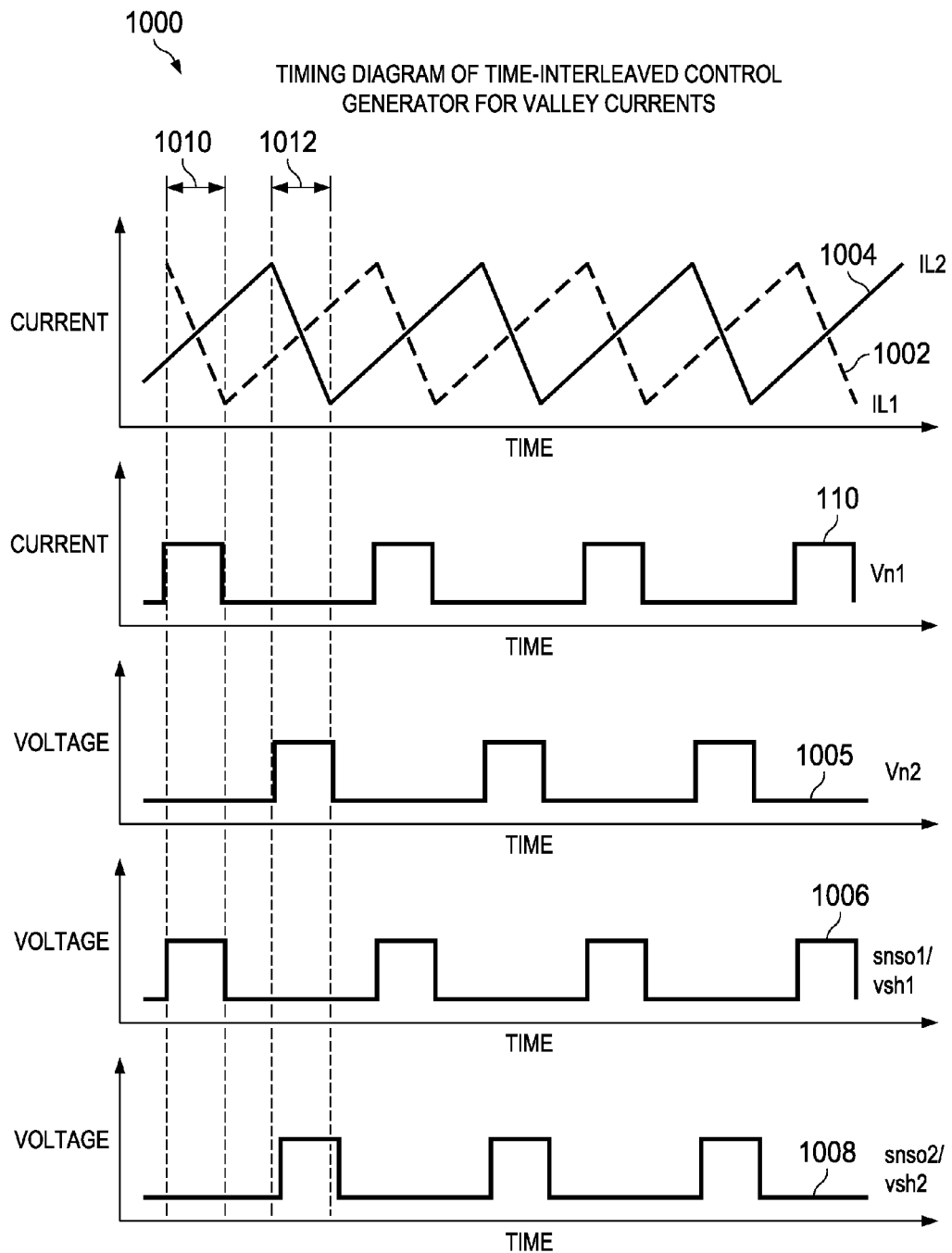
FIG. 10 is an example timing diagram for a time-interleaved control generator for valley current.

FIG. 10 is an example timing diagram 1000 for the example control-interleaved control signal generator 226 for valley currents. The example timing diagram 1000 includes current through an example first inductor (e.g., L1 122) current 1002, an example second inductor current 1004 (e.g., IL2), the example voltage Vn1 110, an example second n-channel driver voltage Vn2 1005, an example first phase control signal 1006, an example phase X control signal 1008, an example first phase n-channel enable duration 1010, and an example phase X re-channel enable duration 1012. Although the example timing diagram 1000 is illustrated with two example phases, and number of phases may be implemented.

During the first phase p-channel enable duration 1010, the example first phase driver 104 outputs a high voltage for Vn1 110. At the same time, the example first phase control signal 1006 (e.g., operating the example snso1 208 and the example control line vhs1 220) is enabled. In some examples, the example first phase control signal 1006 and the example phase X control signal 1008 may include multiple control signals for multiple S/H circuits (e.g., such as intraphase current IC 230 of FIG. 5) associated with the phase. Since Vn1 110 is high and the example first phase control signal 1006 is high, the example IL1 current 1004 decreases. The valley current for the first phase is determined during the example first phase p-channel enable duration 1010.

During the phase X n-channel enable duration 1012, the example phase X driver 106 outputs a high voltage for Vn2 1005. At the same time, the example phase X control signal 1008 (e.g., operating an example switch snso2 and an example control line vhs2 associated with a second phase) is enabled. In some examples, the example first phase control signal 1006 and the example phase X control signal 1008 may include multiple control signals for multiple S/H circuits (e.g., such as intraphase current IC 230 of FIG. 5) associated with the phase. Since Vn2 1005 is high and the example phase X control signal 1008 is high, the example IL2 current 1004 decreases. The valley current for the phase X is determined during the example phase X n-channel enable duration 1012.

Figure 11:
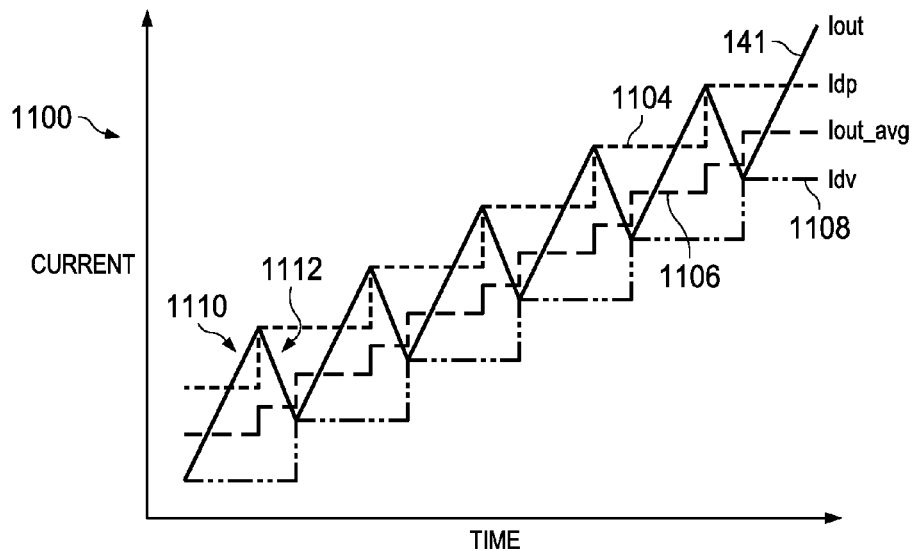
FIG. 11 is an example graph illustrating an example load current used to determine the example droop of FIG. 1.

FIG. 11 is an example graph 1100 illustrating the example output current Iout 141 used to determine the example droop voltage Vdroop 146. The example graph includes the output current Iout 141, an example average peak current (e.g., Idp) 1104, an example average output current (Iout_avg) 1106, an example average valley current (Idv) 1108, an example raising edge 1110, and an example falling edge 1112.

The example graph 1110 displays the outcome of the average measurements performed by the example droop function generator 144. As previously described, the example current-to-voltage converter 224 determines the example Idp 1104 and the example Idv 1108 to determine the example Iout_avg 1106. The example current-to-voltage converter 224 converts the example Iout_avg 1106 to the example droop voltage Vdroop 146 to reduce the reference voltage Vref 148. The example raising edge 1110 represents when a p-channel from a phase is being operated. The example falling edge 112 represents when n-channels from all phases are being operated.

Figure 12:
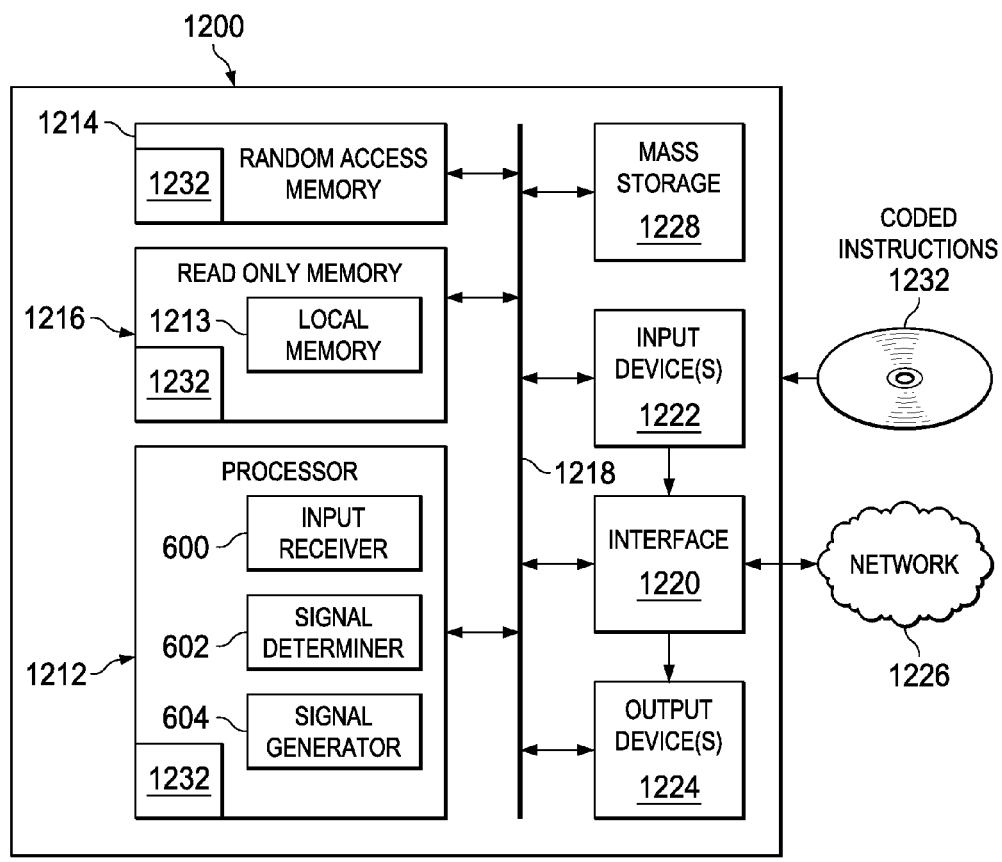
FIG. 12 is a block diagram of a processor platform structured to execute the example machine readable instructions of FIGS. 7-8 to control the example control signal generator of FIGS. 2 and 6.

FIG. 12 is a block diagram of an example processor platform 1200 capable of executing the instructions of FIG. 8 to implement the example clock controller 202 of FIGS. 2 and 4. The processor platform 1200 can be, for example, a server, a personal computer, a mobile device (e.g., a cell phone, a smart phone, a tablet such as an iPad™), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by integrated circuits, logic circuits, microprocessors or controllers from any desired family or manufacturer.

The processor 1212 of the illustrated example includes a local memory 1213 (e.g., a cache). The example processor 1212 of FIG. 12 executes the instructions of FIGS. 7 and 8 to implement the example input receiver 600, the example signal determiner 602, and the example signal generator 604 of FIG. 6 to implement the example clock controller 202. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a clock controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 7 and 8 may be stored in the mass storage device 1228, in the volatile memory 1214, in the non-volatile memory 1216, and/or on a removable tangible computer readable storage medium such as a CD or DVD.

From the foregoing, it would be appreciated that the above disclosed method, apparatus, and articles of manufacture determine a droop voltage for AVP control for multiphase power converters. Using the examples disclosed herein, an 80 milliohm 4-phase buck converter may be implemented with a 92 millivolt voltage droop at 2 Amp peak current within a 1.5% error. Such an AVP control improves load transient response and reduces required capacitance of an off-chip capacitor. Further, examples disclosed herein reduce the need of amplifiers and; thus, minimize the power drawn by the power converter. Additionally, since examples disclosed herein are not temperature dependent, there is no need for additional thermal regulating circuitry.

Conventional techniques either require thermal regulating circuitry or require two amplifiers per phase. Conventional techniques lead to additional circuitry, increased power consumption, and a more complex circuit. By sharing a tracking amplifier for each phase, examples disclosed herein utilize less complex and more energy efficient circuitry to determine a droop voltage for AVP control.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a controller to output a first control signal to enable a first set of switches corresponding to a first voltage of a first phase from a multiphase converter, the first phase included in a plurality of phases;
    an amplifier to enable a first current associated with the first phase to be measured by a sample and hold circuit associated with the first phase;
    the sample and hold circuit to a) sample the first current and b) hold the first current, the first current based on a load current for the first phase of the multiphase converter; and
    a current-to-voltage converter to output a droop voltage based on a plurality of currents corresponding to the plurality of phases of the multiphase converter, the plurality of currents including the load current for the first phase;
    wherein:
    the controller is structured to output a second control signal to enable a second set of switches corresponding to a second voltage of a second phase from the multiphase converter, the second phase included in a plurality of phases;
    the amplifier structured to enable a second current associated with the second phase to be measured by a second sample and hold circuit associated with the second phase; and
    the second sample and hold to a) sample the second current and b) hold the second current, the second current based on a load current for the second phase of the multiphase converter, wherein the plurality of currents including the load current for the second phase.

2. The apparatus of claim 1, wherein the first control signal is disabled when the second control signal is enabled and the second control signal is disabled when the first control signal is enabled.

3. A method comprising:
- outputting a first control signal to enable a first set of switches corresponding to a first voltage of a first phase from a multiphase converter, the first phase included in a plurality of phases;
- enabling a first current associated with the first phase to be measured by a sample and hold circuit associated with the first phase;
- sampling the first current;
- holding the first current, the first current based on a load current for the first phase of the multiphase converter; and outputting a droop voltage based on a plurality of currents corresponding to the plurality of phases of the multiphase converter, the plurality of currents including the load current for the first phase;
- outputting a second control signal to enable a second set of switches corresponding to a second voltage of a second phase from the multiphase converter, the second phase included in a plurality of phases;
- enabling a second current associated with the second phase to be measured by a second sample and hold circuit associated with the second phase; and
- sampling the second current; and
- holding the second current, the second current based on a load current for the second phase of the multiphase converter, wherein the plurality of currents including the load current for the second phase.

4. The method of claim 3, further including:
- disabling the first control signal when the second control signal is enabled; and disabling the second control signal when the first control signal is enabled.

* * * * *